United States Patent
Heckman et al.

(10) Patent No.: US 11,192,587 B2
(45) Date of Patent: Dec. 7, 2021

(54) VEHICLE SUPPORT STRUCTURE ASSEMBLY AND ASSEMBLING METHOD

(71) Applicant: Ford Global Technologies, LLC, Dearborn, MI (US)

(72) Inventors: William G. Heckman, Farmington Hills, MI (US); Vince Anthony Chimento, Plymouth, MI (US); Jeffrey Gray, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 16/837,517

(22) Filed: Apr. 1, 2020

(65) Prior Publication Data

US 2021/0309295 A1 Oct. 7, 2021

(51) Int. Cl.
*B62D 21/03* (2006.01)
*B62D 21/08* (2006.01)
*B62D 33/02* (2006.01)
*B62D 25/20* (2006.01)
*B62D 25/02* (2006.01)

(52) U.S. Cl.
CPC .............. *B62D 21/03* (2013.01); *B62D 21/08* (2013.01); *B62D 25/025* (2013.01); *B62D 25/2036* (2013.01); *B62D 33/02* (2013.01)

(58) Field of Classification Search
CPC ........ B62D 21/03; B62D 21/08; B62D 21/18; B62D 25/2027; B62D 25/2036; B62D 25/2054; B62D 27/023; B62D 33/02

USPC ...... 296/193.07, 193.08, 204, 183.1, 187.11, 296/187.08, 203.04
See application file for complete search history.

(56) References Cited

U.S. PATENT DOCUMENTS

| | | | | |
|---|---|---|---|---|
| 5,273,330 | A * | 12/1993 | Petry | F16B 9/01 293/132 |
| 6,581,955 | B2 | 6/2003 | Aquinto et al. | |
| 6,702,365 | B2 * | 3/2004 | Semple | B62D 33/02 296/183.1 |
| 6,814,397 | B2 * | 11/2004 | Henderson | B62D 33/02 296/181.3 |
| 7,500,714 | B2 * | 3/2009 | Abe | B62D 21/157 296/187.09 |
| 7,665,800 | B2 | 2/2010 | Werner | |
| 8,177,293 | B2 * | 5/2012 | Boettcher | B62D 33/023 296/204 |
| 8,632,121 | B1 * | 1/2014 | Sundararajan | B62D 21/157 296/187.08 |
| 9,056,637 | B2 * | 6/2015 | Takata | B62D 23/005 |
| 9,126,630 | B1 * | 9/2015 | Gallagher | B62D 33/0273 |
| 10,137,943 | B2 * | 11/2018 | Rompage | B05D 7/14 |
| 2004/0239091 | A1 * | 12/2004 | Horton | B62D 23/005 280/781 |

(Continued)

*Primary Examiner* — Gregory A Blankenship
(74) *Attorney, Agent, or Firm* — David Coppiellie, Esq.; Carlson, Gaskey & Olds, P.C.

(57) ABSTRACT

A vehicle support structure according to an exemplary aspect of the present disclosure includes, among other things, a cross-member of a vehicle support structure. The cross-member extends longitudinally along a cross-member axis. The frame assembly further includes a rail of the vehicle support structure. The rail extends longitudinally along a rail axis that is transverse to the cross-member axis. The rail extends into a pocket of the cross-member such that a portion of the rail is nested within the cross-member.

17 Claims, 5 Drawing Sheets

(56) References Cited

U.S. PATENT DOCUMENTS

| | | | | |
|---|---|---|---|---|
| 2005/0062307 A1* | 3/2005 | Nakagawa | ............ | B62D 29/008 |
| | | | | 296/29 |
| 2005/0236867 A1* | 10/2005 | McNulty | .............. | B62D 33/023 |
| | | | | 296/183.1 |
| 2007/0267896 A1* | 11/2007 | Werner | ................... | B62D 33/02 |
| | | | | 296/203.04 |
| 2008/0150322 A1* | 6/2008 | Shelbo | ................... | B62D 33/02 |
| | | | | 296/184.1 |
| 2008/0277969 A1* | 11/2008 | Sato | ................... | B62D 25/2054 |
| | | | | 296/193.08 |
| 2011/0298245 A1 | 12/2011 | Jarocki et al. | | |
| 2013/0277955 A1* | 10/2013 | Wagner | ................ | B62D 27/023 |
| | | | | 280/796 |
| 2014/0159428 A1* | 6/2014 | Katou | ................ | B62D 25/2027 |
| | | | | 296/193.08 |
| 2017/0043809 A1* | 2/2017 | Cortes Saenz | ......... | B62D 21/03 |
| 2018/0257709 A1 | 9/2018 | Casali | | |
| 2020/0223495 A1* | 7/2020 | Stibich | ................... | B62D 33/02 |
| 2021/0309295 A1* | 10/2021 | Heckman | ............ | B62D 25/2036 |

* cited by examiner

VEHICLE SUPPORT STRUCTURE ASSEMBLY AND ASSEMBLING METHOD

TECHNICAL FIELD

This disclosure relates generally to a vehicle support structure and more particularly to a cross-member and a rail of the vehicle support structure.

BACKGROUND

Vehicles, such as pickup trucks, can have a vehicle support structure that acts as a primary supporting structure of the vehicle. The vehicle support structure typically has rails that extend longitudinally along a length of the vehicle, and cross-members that extend in a cross-vehicle direction. The cross-members are joined to the rails.

SUMMARY

A vehicle support structure assembly according to an exemplary aspect of the present disclosure includes, among other things, a cross-member of a vehicle support structure. The cross-member extends longitudinally along a cross-member axis. The vehicle support structure further includes a rail of the vehicle support structure. The rail extends longitudinally along a rail axis that is transverse to the cross-member axis. The rail extends into a pocket of the cross-member such that a portion of the rail is nested within the cross-member.

In another example of the foregoing assembly, the pocket is spaced inboard from an outboard edge of the cross-member such that a portion of the cross-member is disposed outboard the vehicle rail.

In another example of any of the foregoing assemblies, the portion of the vehicle cross-member disposed outboard of the vehicle rail supports a D-pillar.

In another example of any of the foregoing assemblies, the cross-member is a rearmost cross-member of the vehicle support structure.

In another example of any of the foregoing assemblies, the cross-member is a rear sill.

In another example of any of the foregoing assemblies, the vehicle support structure is a unibody vehicle support structure.

In another example of any of the foregoing assemblies, the cross-member has a hat-shaped longitudinal cross-section that opens downward, and the rail has a hat-shaped longitudinal cross-section that opens upward.

In another example of any of the foregoing assemblies, a rearward side of the cross-member includes an opening that enables access to an interior of the rail.

Another example of any of the foregoing assemblies includes an accessory attachment arm that extends through the opening into the interior of the rail. The accessory attachment arm is directly connected to the rail.

In another example of any of the foregoing assemblies, the rail is a driver side rail. The assembly further includes a passenger side rail. The cross-member is directly secured to both the driver side rail and the passenger side rail.

In another example of any of the foregoing assemblies, the rail is recessed vertically within the pocket of the cross-member.

In another example of any of the foregoing assemblies, an uppermost surface of a portion of the rail within the pocket is nominally vertically aligned with an uppermost surface of the cross-member.

Another example of any of the foregoing assemblies includes a cargo bed floor disposed directly adjacent both the uppermost surface of the portion of the rail and the uppermost surface of the cross-member.

In another example of any of the foregoing assemblies, the vehicle support structure is a vehicle support structure of a pickup truck.

A vehicle support structure assembling method according to another exemplary aspect of the present disclosure includes, among other things, supporting a longitudinal end portion of a rail of a vehicle support structure within a pocket of a cross-member of a vehicle. The method further includes positioning a cargo bed floor against both an uppermost surface of the rail and an uppermost surface of the vehicle support structure.

Another example of the foregoing method includes extending an accessory attachment arm through an aperture in the cross-member into an interior of the rail, and then attaching the accessory attachment arm to the rail.

In another example of any of the foregoing methods, the rail is recessed vertically within the pocket.

In another example of any of the foregoing methods, the cross-member is a rear sill of a pickup truck.

In another example of any of the foregoing methods, the cross-member has a hat-shaped longitudinal cross-section that opens downward, and the rail has a hat-shaped longitudinal cross-section that opens upward.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary vehicle support structure and a vehicle support structure assembling method. In the disclosed embodiments, a longitudinal end portion of a rail of a vehicle support structure is disposed within a pocket of a cross-member the vehicle support structure. The cross-member can be a rear sill of a pickup truck, for example.

Figure 1:
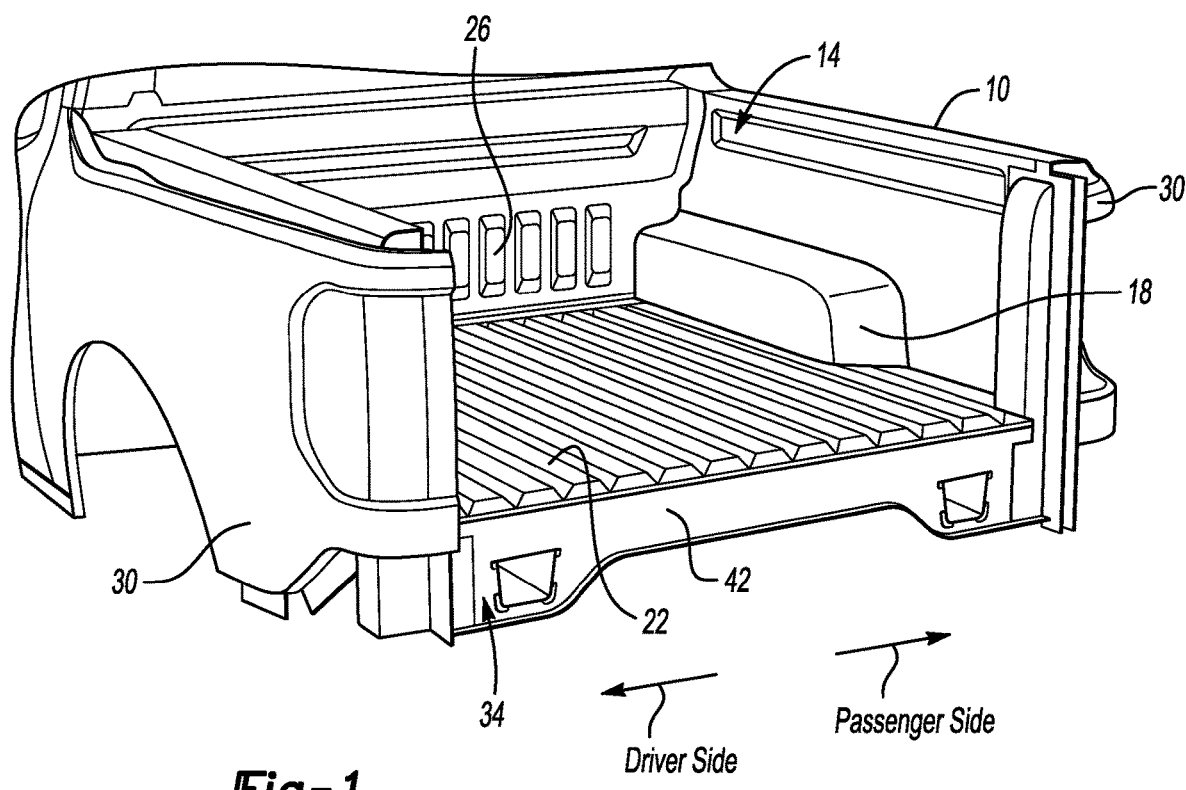
FIG. 1 shows a rear view of a selected portions of a vehicle having a vehicle support structure according to an exemplary aspect of the present disclosure.
Figure 2:
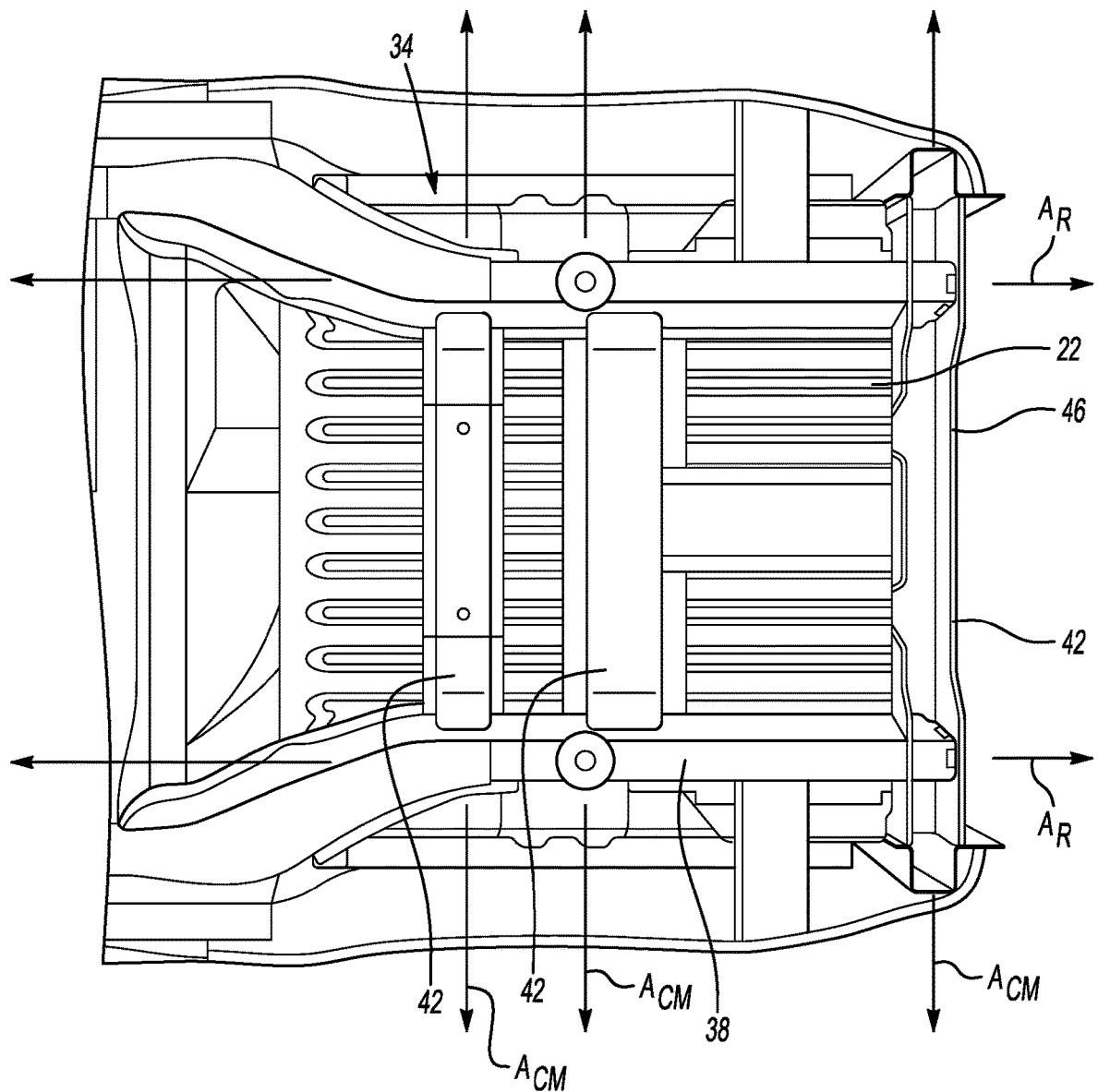
FIG. 2 shows a bottom view of the portions of the vehicle in FIG. 1.

With reference to FIGS. 1 and 2, a vehicle 10 includes a cargo bed 14. The vehicle 10, in the exemplary embodiment, is a pickup truck.

The cargo bed 14 is bounded along each side by an inner panel 18. A cargo bed floor 22 establishes a bottom of the cargo bed 14. A front panel 26 extends in a cross-vehicle direction and provides a front boundary of the cargo bed 14. A tailgate, not shown, can provide an aft boundary of the cargo bed 14. Outer body panels 30 are disposed on outer sides of the inner panels 18.

The vehicle 10 includes a vehicle support structure 34 that, among other things, supports the inner panels 18, the cargo bed floor 22, and the outer body panels 30. The vehicle support structure 34 includes a pair of rails 38, and cross-members 42. One of the rails 38 is on a driver side of the vehicle support structure 34. The other one of the rails 38 is on a passenger side of the vehicle support structure 34.

Beneath the cargo bed 14, the rails 38 extend longitudinally along a length of the vehicle 10, and each of the rails 38 extends longitudinally along a respective rail axis $A_R$. The cross-members 42 extend longitudinally between the rails 38 in a cross-vehicle direction. The cross-members 42 each extend longitudinally along a respective cross-member axis $A_{CM}$, which is transverse to the rail axes $A_R$. The cross-member 42 that is the aftmost cross-member of the vehicle 10 is a rear sill 46. Pickup trucks typically include rear sills located beneath a tailgate and a rear end of their cargo bed floors. The rear sills can tie together the rear ends of the rails. The opposing laterally outboard end portions of the rear sills can support D-pillars of the pickup truck.

Figure 3:
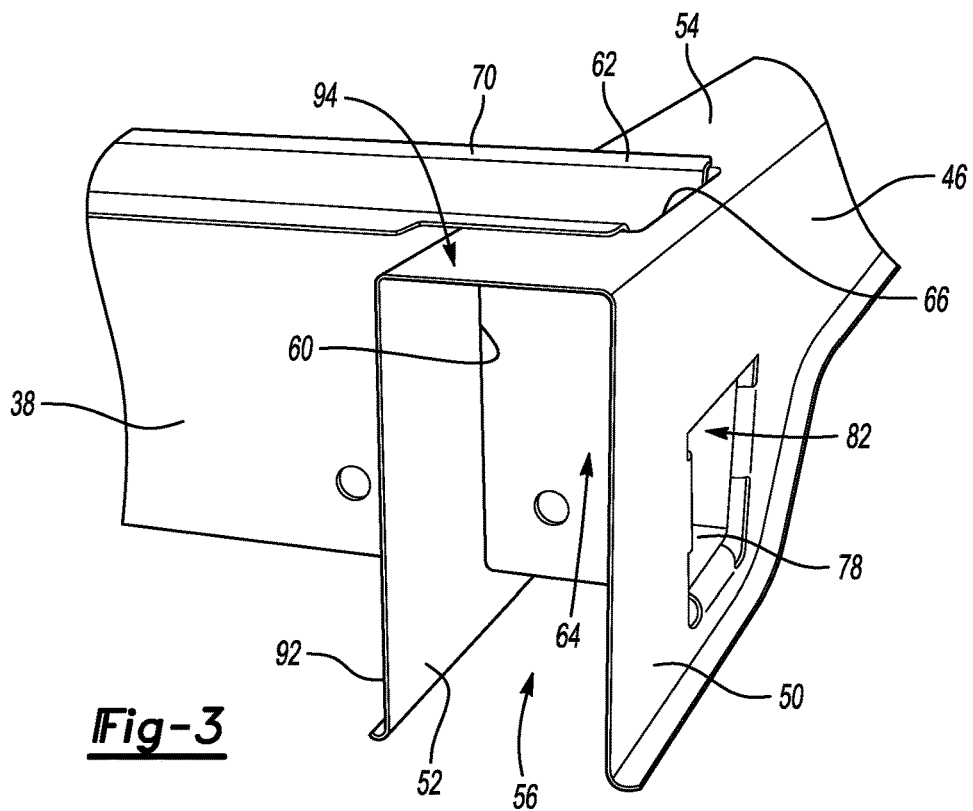
FIG. 3 shows a perspective view of a cross-member and a rail of the vehicle support structure from the vehicle of FIG. 1.
Figure 4:
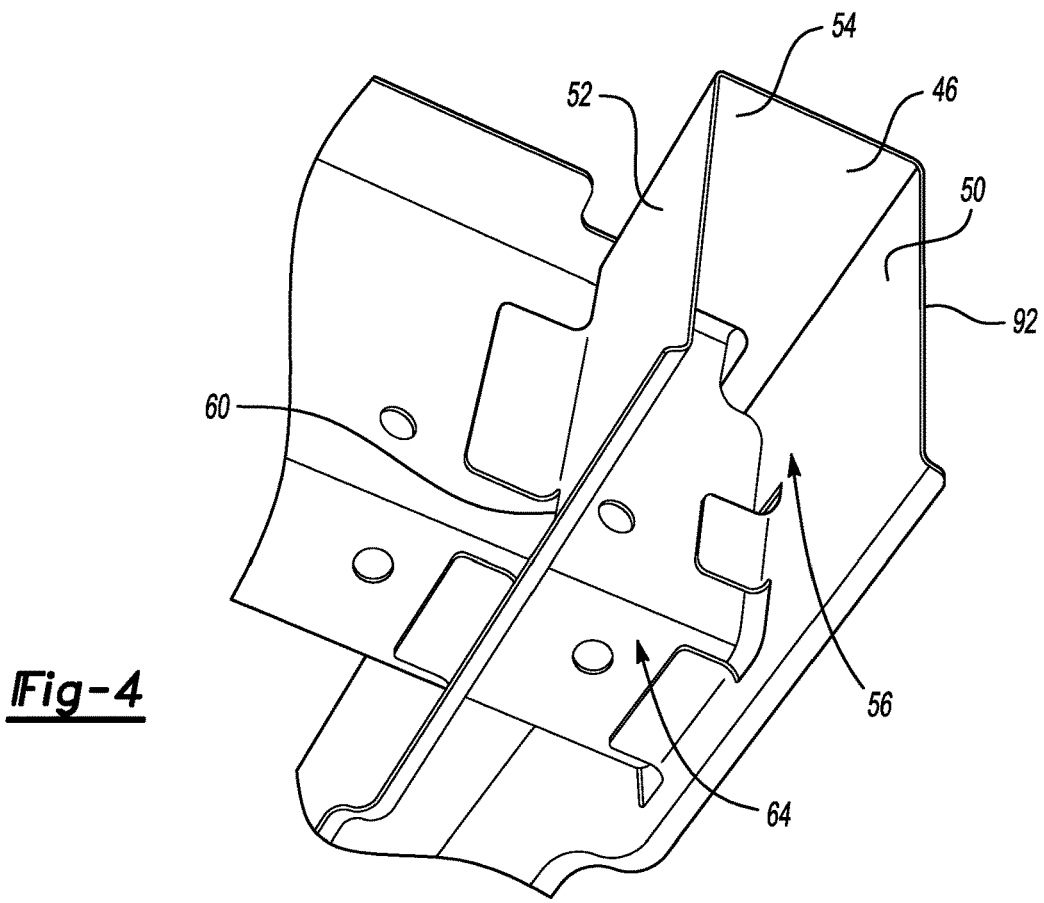
FIG. 4 illustrates a bottom perspective view of the portions of the cross-member and support structure of FIG. 3.
Figure 5:
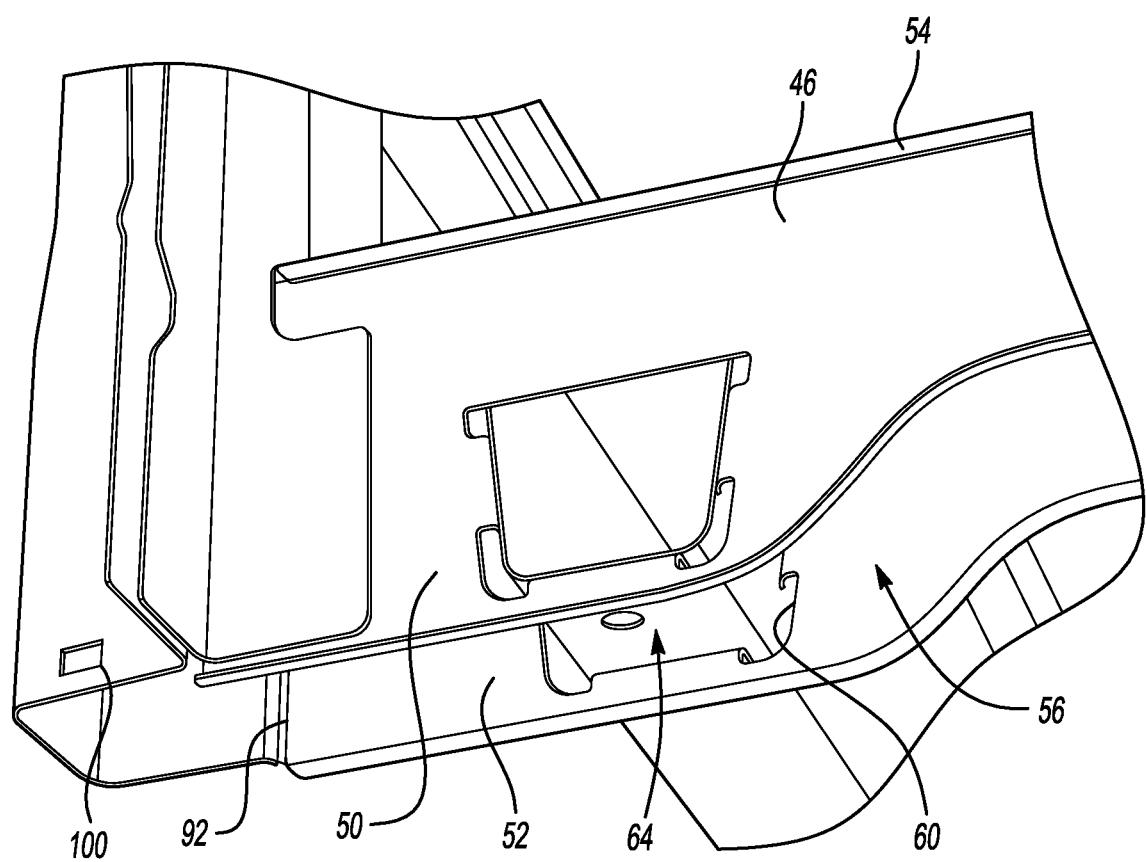
FIG. 5 shows another perspective view of the cross-member and the rail from FIG. 3 when a D-pillar is attached to an outboard end portion of the cross-member.

With reference now to FIGS. 3-5 and continuing reference to FIGS. 1-2, the vehicle support structure 34 is a unibody type support structure. As understood, a unibody type support structure can include stamped sheet metal rails and cross-members. In contrast, body-on-frame type support structures typically include tube steel rails and cross-members. A body-on-frame support structure can include a ladder frame assembly with cross-members. Rear sills of such body-on-frame type support structures are independent of the ladder frame assembly and are attached to the body structure of a pickup box or "second unit body." The rear sill is bolted on the ladder frame assembly of the body-on-frame support structure with the pickup box.

The rear sill 46 of the exemplary vehicle support structure has a hat-shaped longitudinal cross-section opening downward. The remaining cross-members 42 have a hat-shaped longitudinal cross-section opening upward. The rails 38 also have a hat-shaped longitudinal cross-sections opening upward. The rails 38 and cross-members 42 can be stamped from planar sheets of material to provide the hat-shaped longitudinal cross-sections. The rails 38 are stamped from sheets of boron steel in this example. The rear sill 46 is stamped from a sheet of HSLA steel in this example.

The rear sill 46 has a rearward side 50, a forward side 52, and an upper side 54. An interior 56 of the rear sill 46 is bounded by the rearward side 50, the forward side 52, and the upper side 54.

The rearward side 50 and forward side 52 are generally disposed along vertically extending planes that are spaced horizontally from each other along a length of the vehicle 10. The upper side 54 extends from the rearward side 50 to the forward side 52. The rearward side 50 extends vertically downward from a rear of the upper side 54. The forward side 52 extends vertically downward from a front of the upper side 54. The upper side 54 is generally disposed along a horizontal plane.

Horizontal and vertical, for purposes of this disclosure, are with reference to ground and a general orientation of the vehicle 10 during ordinary operation. Forward and rearward are also with reference to the general orientation of the vehicle 10.

The rail 38 on the driver side of the vehicle 10 extends longitudinally into a pocket 60 on a driver side of the rear sill 46. The rail 38 extends into the pocket 60 such that a longitudinal end portion 64 of the rail 38 is nested within the pocket 60 of the rear sill 46 horizontally between the rearward side 50 and the forward side 52 of the rear sill 46, and vertically beneath the upper side 54 of the rear sill 46. The rail 38 on a passenger side of the vehicle support structure 34 extends longitudinally into a corresponding pocket on a passenger side of the rear sill 46.

The forward side 52 of the rear sill 46 and the upper side 54 of the rear sill 46 include openings providing the pocket 60. The openings permit movement of the longitudinal end portion 64 into the interior 56 between the rearward side 50 and the forward side 52 of the rear sill 46 so that the longitudinal end portion 64 is nested within the rear sill 46.

Nested, for purposes of this disclosure, means that that the longitudinal end portion 64 at least partially fits inside the rear sill 46 within the interior 56 of the rear sill 46. Due to the nesting, the rail 38 is interlocked with the rear sill 46.

During assembly, the rear sill 46 can be moved vertically upward to receive the longitudinal end portion 64 within the pocket 60. Interlocking the rail 38 and rear sill 46 in this way can take advantage of the draft angles of the rail 38.

When the longitudinal end portion 64 of the rail 38 is extended into the pocket 60, the upper side 54 of the rear sill 46 is substantially vertically aligned with an uppermost surface 62 of the rail 38. That is, in the exemplary embodiment, the uppermost portions of the rear sill 46 are nominally coplanar with the uppermost portions the rail 38.

The upper side 54 of the rear sill 46 can includes a recessed collar 66 about the opening within the upper side 54. Opposing horizontally extending flanges 70 of the rail 38 can fit within the recessed collar 66. The recessed collar 66 allows these flanges 70 to be vertically aligned with the surrounding areas of the upper side 54 of the rear sill 46 to provide a substantially coplanar surface for supporting the cargo bed floor 22.

The uppermost portion of the rear sill 46 could be, for example, slightly higher, say a few millimeters higher, than the uppermost portion of the rail 38 and still be substantially coplanar. A spacer could then be placed atop the rail 38 between the rail 38 and the cargo bed floor 22 to support the cargo bed floor 22.

In the past, cross-members of support structures, such as body-on-frame support structures, have been supported atop an uppermost surface of rails. As can be appreciated, nesting the rail 38 within the rear sill 46 such that the uppermost surface 62 of the rail 38 and the upper side 54 of the rear sill 46 are substantially vertically aligned permits the cargo bed floor 22 to be supported at a position much lower than past support structure configurations where the cross-members are atop the rails. Supporting the cargo bed floor 22 at a lower vertical position than past support structure configurations can, among other things, provide a reduced step-in height to the cargo bed 14 and increase a size of the cargo bed 14 when compared to past support structure configurations.

Weld flanges can be formed in the rear sill 46, the rail 38, or both. Welds, such as spot welds, within weld flanges of the rear sill 46 can secure the rear sill 46 to the rail 38. Welds within weld flanges of the rail 38 can secure the rail 38 to the rear sill 46.

In the exemplary embodiment, the rail 38 extends rearward to the rearward side 50 of the rear sill 46. Extending the rail 38 to this position rather than stopping the rail 38 at the forward side 52 of the rear sill 46 can, in some examples, enhance performance when a rear end of the vehicle 10 is loaded.

The rearward side 50 of the rear sill 46 includes an opening 78. An interior 82 of the rail 38 can be accessed through the opening 78. A user can access the rail 38 through the opening 78 in the rear sill 46. Accessories, such as a rear bumper assembly or trailer hitch, can be directly connected to the rail 38 through the opening 78.

Figure 6:
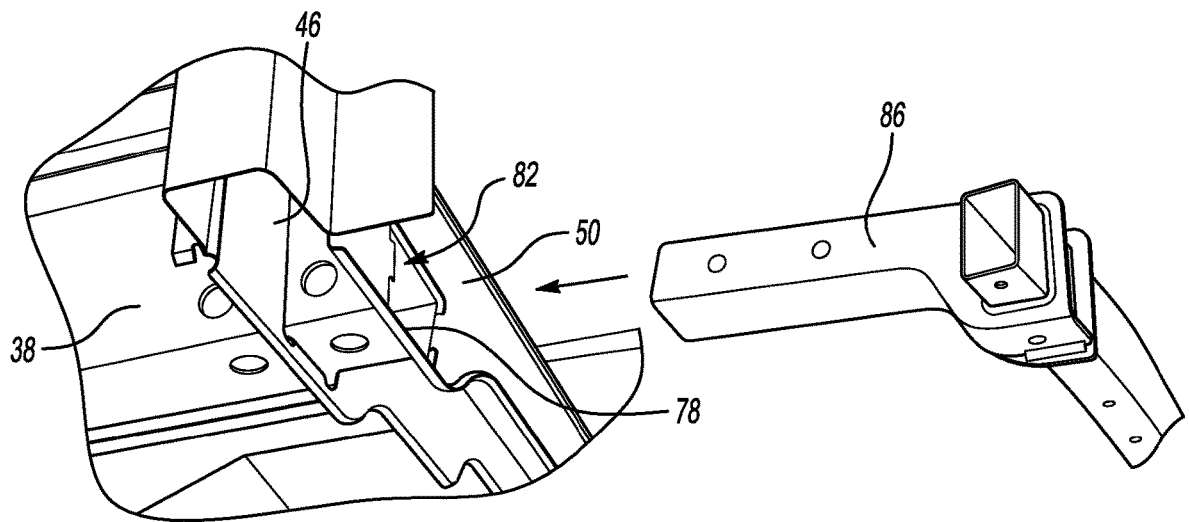
FIG. 6 shown an early stage of assembling an accessory attachment arm to an end of the rail of FIGS. 3-5.
Figure 7:
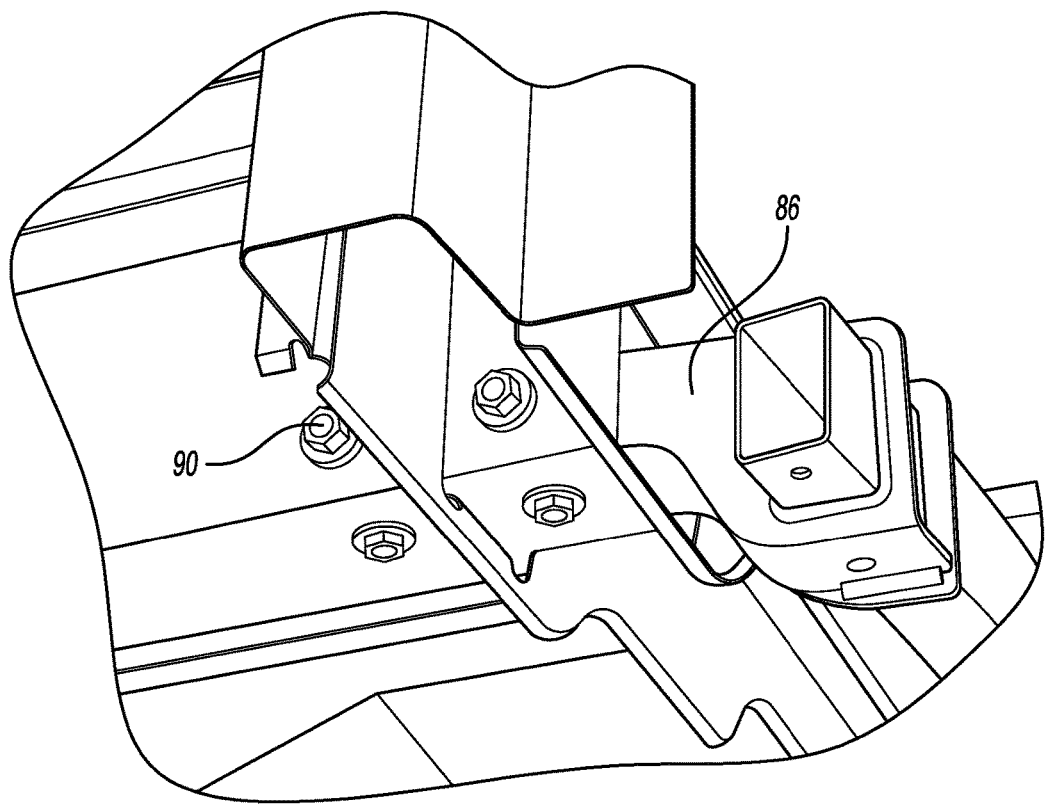
FIG. 7 shows the accessory attachment arm secured to the end of the rail of FIG. 6.

For example, with reference to FIGS. 6 and 7, an accessory attachment arm, here a bumper attachment arm 86, can be moved through the opening 78 in the rearward side 50 of the rear sill 46 such that a portion of the bumper attachment arm 86 is disposed within the interior 82 of the rail 38. Mechanical fasteners 90 can then be used to secure the portion of the bumper attachment arm 86 directly to the rail 38.

With reference again to FIGS. 1-5, the pocket 60 is spaced laterally inboard from an outboard edge 92 of the rear sill 46 such that an outboard portion 94 of the rear sill 46 is disposed outboard the longitudinal end portion 64 of the rail 38. The outboard portion 94 of the rear sill 46 can be directly connected to a D-pillar 100 of the vehicle 10 as shown in FIG. 5. The outboard portion 94 can directly support the D-pillar 100.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle support structure assembly, comprising:
   a cross-member of a vehicle support structure, the cross-member extending longitudinally along a cross-member axis; and
   a rail of the vehicle support structure, the rail extending longitudinally along a rail axis that is transverse to the cross-member axis, the rail extending into a pocket of the cross-member such that a portion of the rail is nested within the cross-member, wherein the cross-member is a rear sill.

2. The vehicle support structure of claim 1, wherein the pocket is spaced inboard from an outboard edge of the cross-member such that a portion of the cross-member is disposed outboard the vehicle rail.

3. The vehicle support structure of claim 2, wherein the portion of the vehicle cross-member disposed outboard the vehicle rail supports a D-pillar.

4. The vehicle support structure of claim 1, wherein the cross-member is a rearmost cross-member of the vehicle support structure.

5. The vehicle support structure of claim 1, wherein the vehicle support structure is a unibody vehicle support structure.

6. The vehicle support structure of claim 1, wherein a rearward side of the cross-member includes an opening that enables access to an interior of the rail.

7. The vehicle support structure of claim 6, further comprising an accessory attachment arm that extends through the opening into the interior of the rail, the accessory attachment arm directly connected to the rail.

8. The vehicle support structure of claim 1, wherein the rail is a driver side rail, and further comprising a passenger side rail, the cross-member directly secured to both the driver side rail and the passenger side rail.

9. The vehicle support structure of claim 1, wherein the rail is recessed vertically within the pocket of the cross-member.

10. The vehicle support structure of claim 9, wherein an uppermost surface of a portion of the rail within the pocket is nominally vertically aligned with an uppermost surface of the cross-member.

11. The vehicle support structure of claim 10, further comprising a cargo bed floor that is disposed directly adjacent both the uppermost surface of the portion of the rail and the uppermost surface of the cross-member.

12. The vehicle support structure of claim 1, wherein the vehicle support structure is a vehicle support structure of a pickup truck.

13. A vehicle support structure assembly, comprising:
    a cross-member of a vehicle support structure, the cross-member extending longitudinally along a cross-member axis; and
    a rail of the vehicle support structure, the rail extending longitudinally along a rail axis that is transverse to the cross-member axis, the rail extending into a pocket of the cross-member such that a portion of the rail is nested within the cross-member,
    wherein the cross-member has a hat-shaped cross-section that opens downward, and the rail has a hat-shaped cross-section that opens upward.

14. A vehicle support structure assembling method, comprising:
    supporting a longitudinal end portion of a rail of a vehicle support structure within a pocket of a cross-member of a vehicle; and
    positioning a cargo bed floor against both an uppermost surface of the rail and an uppermost surface of the cross-member, wherein the cross-member is a rear sill of a pickup truck.

15. The vehicle support structure assembling method of claim 14, wherein the rail is recessed vertically within the pocket.

16. The vehicle support structure assembling method of claim 14, wherein the cross-member has a hat-shaped cross-section that opens downward, and the rail has a hat-shaped cross-section that opens upward.

17. A vehicle support structure assembling method, comprising:
    supporting a longitudinal end portion of a rail of a vehicle support structure within a pocket of a cross-member of a vehicle;
    positioning a cargo bed floor against both an uppermost surface of the rail and an uppermost surface of the cross-member; and
    extending an accessory attachment arm through an aperture in the cross-member into an interior of the rail, and then attaching the accessory attachment arm to the rail.

\* \* \* \* \*